United States Patent [19]
Risius

[11] 3,768,088
[45] Oct. 23, 1973

[54] TRAILER STAND LEG POSITION INDICATOR

[75] Inventor: George Risius, 809 Northeast Madison St., Peoria, Ill. 61603

[22] Filed: Nov. 5, 1971

[21] Appl. No.: 195,931

[52] U.S. Cl. ............... 340/282, 340/52 R, 180/103, 200/61.44, 254/86 R, 280/150.5
[51] Int. Cl. ...... B60s 9/00, G08b 21/00, B60g 9/00
[58] Field of Search ................. 340/275, 52 R, 282, 340/421, 27 R, 80, 75; 280/421, 422, 150.5; 254/86 R, 70, DIG. 2; 200/86 R, 86 H, 61.44; 180/103, 111

[56] References Cited
UNITED STATES PATENTS

| | | | |
|---|---|---|---|
| 2,001,411 | 5/1935 | Davis | 280/422 |
| 3,181,887 | 5/1965 | Boylan et al. | 280/421 |
| 3,535,679 | 10/1970 | Connors | 340/275 X |
| 2,887,672 | 5/1959 | Morano et al. | 340/52 R |
| 2,714,200 | 7/1955 | Teegarden | 340/27 R |

Primary Examiner—Thomas B. Habecker
Assistant Examiner—William M. Wannisky
Attorney—David Paul Weaver et al.

[57] ABSTRACT

A signalling arrangement for warning when the stand leg of a trailer, that is connected to a tractor, is not raised off the ground. The signalling arrangement includes a warning light and a buzzer mounted on the instrument panel of the tractor, a switch actuator located in the trailer in such a position as to be shifted when the stand leg is raised from the ground, and an electric circuit so connecting in series the battery in the tractor, the warning light and buzzer and the switch actuator that the switch actuator is moved from a position where it causes the warning light and buzzer to be turned on when the stand leg is engaging the ground to a position where it causes the warning light and buzzer to be turned off in response to the raising of the stand leg from the ground.

5 Claims, 5 Drawing Figures

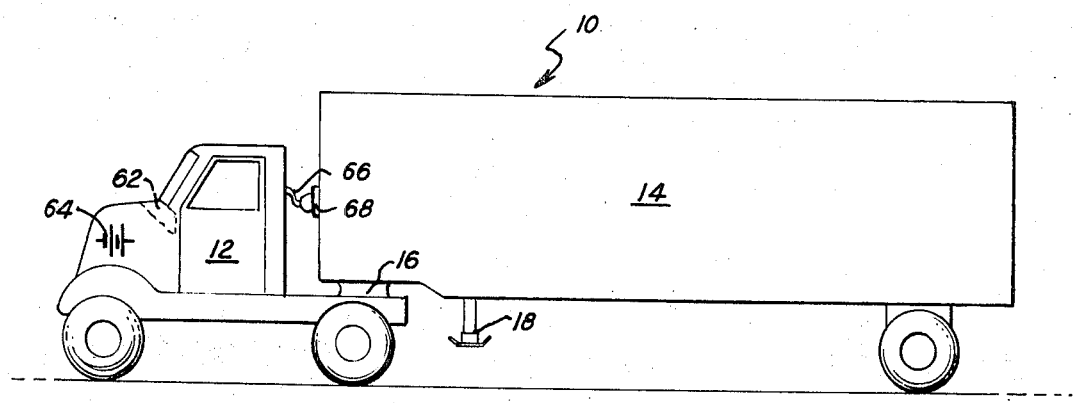
FIG. 1
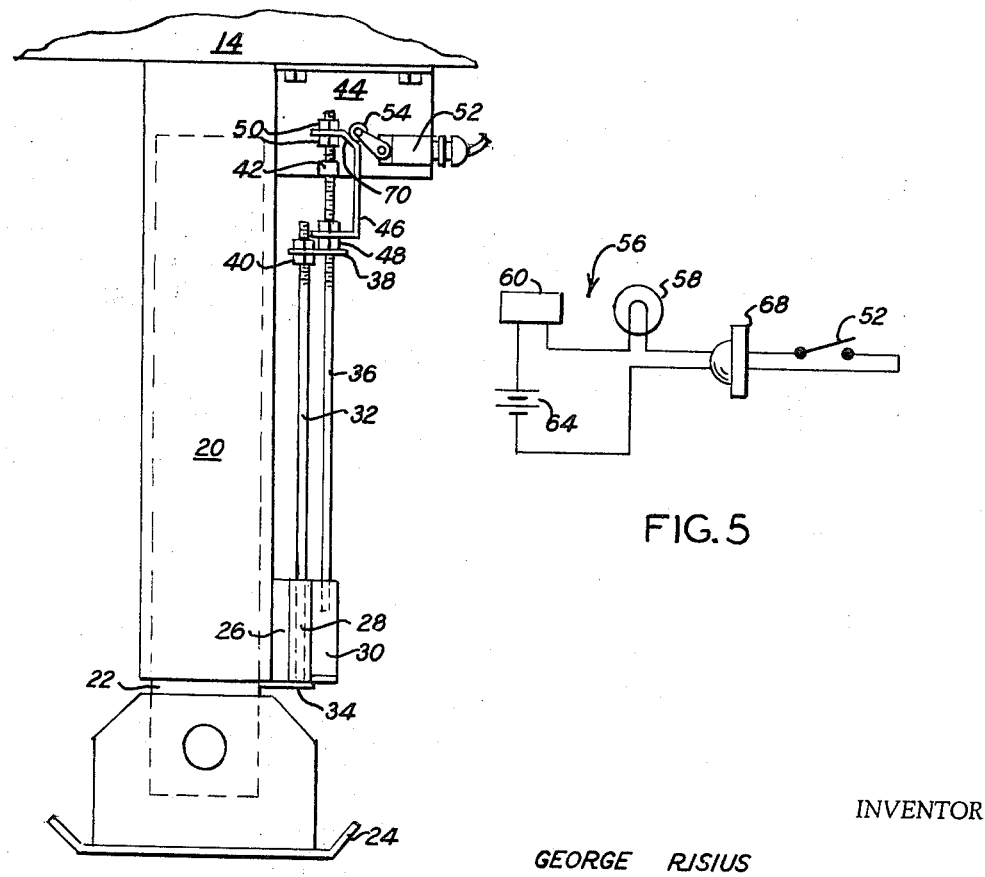
FIG. 5
FIG. 4
INVENTOR
GEORGE RISIUS
BY Kimmel, Crowell & Weaver
ATTORNEYS

INVENTOR
GEORGE RISIUS

BY Kimmel, Crowell & Weaver
ATTORNEYS

TRAILER STAND LEG POSITION INDICATOR

BACKGROUND OF THE INVENTION

A tractor and a trailer of a truck assembly are separably connected by a connecting device, usually a fifth wheel, when the truck assembly is in condition to move on the road. When the trailer and tractor are to be detached from each other, stand legs are lowered from the trailer to the ground to support the trailer. When the tractor and the trailer are connected to each other so as to place the truck assembly in condition for movement, the stand legs must be raised off the ground in order to avoid accidents resulting from the contact of the stand legs with the road pavement and the consequent damage, not only to the stand legs, but also to the trailer. The stand legs can be in position to contact the ground during the movement of the truck assembly due to the failure of the driver to raise the stand legs from the ground and also due to the failure of a locking mechanism to retain any of the stand legs in its raised position.

SUMMARY OF THE INVENTION

The object of this invention is to provide a signalling arrangement that warns the driver, while the tractor and trailer are connected to each other, when any of the stand legs is not in its raised off-the-ground position. The signalling arrangement includes a signal in the tractor and an actuator for the signalling device located in the trailer. A separable circuit extends between the actuator and the signalling device so as to be joined when the tractor and the trailer are connected. An operating mechanism is so related to the stand leg as to cause the actuating member to turn on the signal when the stand leg is in a lower ground engaging position and to cause the actuating member to turn off the signal when the stand leg is in an upper off-the-ground position.

BRIEF DESCRIPTION OF THE DRAWING

FIG. 1 is a view of the truck assembly;

FIG. 4 is an elevation similar to FIG. 2 showing the stand leg in a raised position; and FIG. 5 is a diagram of the electrical circuit of the signalling arrangement.

DESCRIPTION OF THE PREFERRED EMBODIMENT

Figures 2, 3:
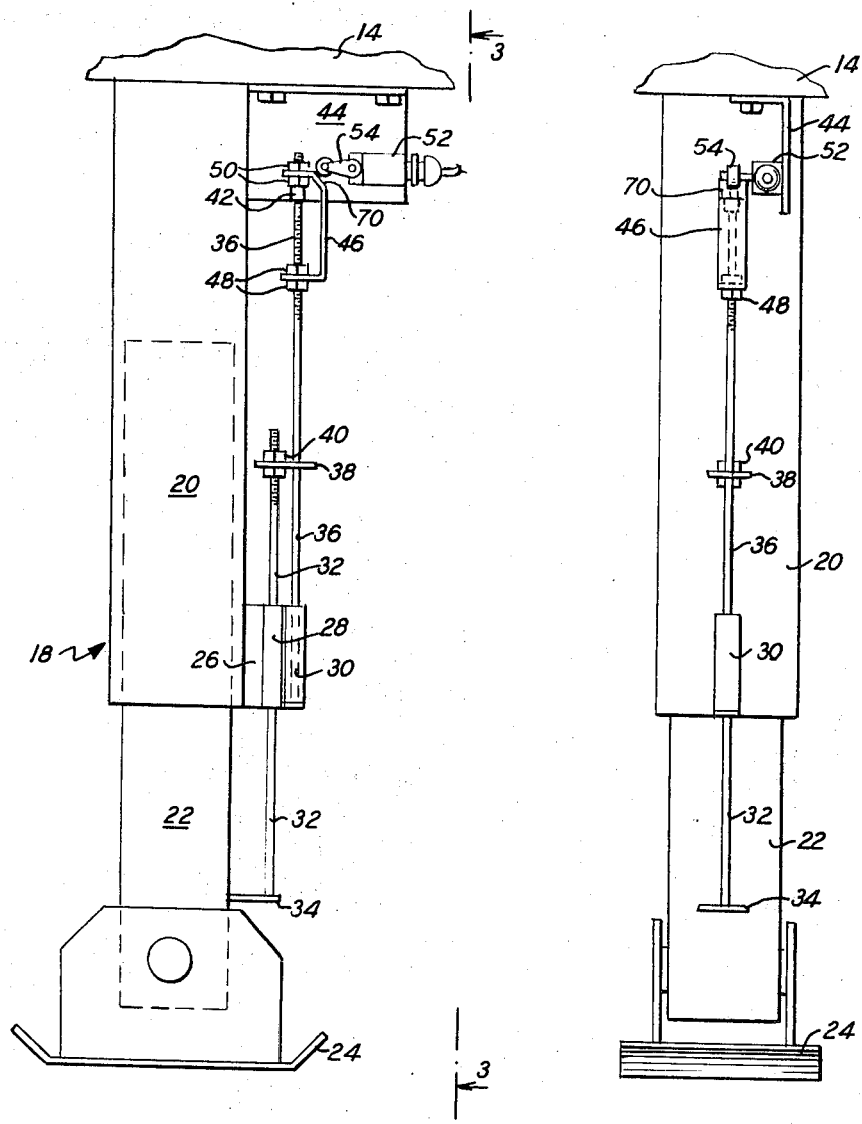
FIG. 2 is an elevation of a stand leg and a portion of the signalling arrangement.
FIG. 3 is an elevation taken on the line 3—3 of FIG. 2.

Referring to FIG. 1, 10 designates a truck assembly formed of a tractor 12 and a trailer 14 that are separably connected to each other by a fifth wheel 16. A plurality of stands 18 are mounted to the trailer for heightwise movement in any conventional manner as, for example, by a hand crank. When the tractor 12 and the trailer 14 are to be disconnected from each other, the stands are lowered to the ground to support the trailer. The stands are constructed, in accordance with this invention, in the manner shown in FIGS. 2 and 3.

The stand 18 comprises a hollow housing 20 secured to and depending from the trailer 14 in which a stand leg 22 is mounted for heightwise movement. Conventional mechanism, not shown, is connected to the stand leg 22 for effecting its heightwise movement in the housing 20 and for locking it in an upper or a lower position. A ground engaging skid 24 is pivoted to the bottom of the leg 22. A plate 26 is secured to the bottom of the housing 20, and a pair of vertically extending guide tubes 28 and 30 are secured to the plate 26. An operating rod 32, secured to the leg 22 by means of a plate 34, extends through the guide tube 28. The guide tube 30, which is closed at its bottom, receives an activating rod 36. The activating rod 36 extends through a hole in an activating collar 38 that is secured to the top of the operating rod 32 by lock nuts 40. The upper end of the activating rod 36 extends through a guide tube 42 that is secured to an angle 44, the angle 44 being affixed to the bottom of the trailer 14. An operating bar 46 is anchored at its bottom between a pair of lock nuts 48 that are threaded onto the activating rod 36. The top of the operating bar 46 is anchored above the guide tube 42 between a pair of lock nuts 50 that are threaded onto the activating rod 36 above the guide tube 42. An electric switch 52, mounted to the angle 44, has an actuator 54 that is in registry with the operating bar 46.

Referring to FIGS. 1 and 5, signalling means 56, in the form of a warning light 58 and a buzzer 60 are mounted on the instrument panel 62 of the tractor 12. The signalling means 56 is in series with the battery 64 in the tractor and with the switch 52 by means that includes a cable 66 that extends from the tractor 12 to a terminal block 68 mounted to the trailer 14. By disconnecting the cable 66 from the terminal block 68, the electrical connection between the switch 52 and the signalling means 56 may be opened.

When the tractor 12 and the trailer 14 are disconnected from each other, the stand legs 22 and the skids 24 are in their lower positions so that the skids are engaging the ground to support the trailer. In this position, as shown in FIGS. 2 and 3, the bottom of the activating rod is seated in the closed bottom of the guide tube 30, the lock nuts 50 are seated on the guide tube 42 and a sloping operating surface 70 at the top of the operating bar 46 is in registry with but below the switch actuator 54. In the FIG. 2 position of the switch actuator 54, the switch 52 is closed.

When the tractor 12 and the trailer 14 are connected to each other by means of the fifth wheel 16 and the cable 66 is connected to the terminal lock 68, the signalling means 56 is energized in such a manner as to turn on the warning light 58 and to sound the buzzer 60. A raising of the stand leg 22 raises the operating rod 32 with the activating collar 38 moving upwardly along the activating rod 36 until the activating collar engages the abutment formed by lowermost nut 48 to thereby raise the activating rod together with the operating bar 46 to the position shown in FIG. 4 at which point the stand leg is locked in its upper position. The raising of the operating bar 46 causes the operating surface 70 of the operating bar 46 to engage and raise the switch actuator 54 to thereby open the switch and thus turn off the signalling means.

From the foregoing, it can be seen that the signalling means 56 warns the driver if at least one of the stands 18 is in its lower position so that he will be sure to raise all of the stands before driving off. In addition, should any of the stands 18 descend from their upper positions while the truck assembly 10 is in motion due to the failure of the driver to lock the stand in its upper position or by a failure of the locking mechanism to hold the stand in its upper position, the operating bar 46 will move downwardly from the FIG. 4 position to the FIG. 2 position thus enabling the switch actuator 54 to close the switch 52 and turn on the signalling means 56 so that the drive may stop the truck assembly and remedy the situation.

Thus, the driver may avoid accidents resulting from the contact of any of the skids 24 with the pavement while the truck assembly 10 is in motion and the consequent damage not only to the stand 18 but to the trailer 14.

I claim:

1. In a truck assembly comprising a tractor; a trailer; separable connecting means for connecting the tractor and the trailer; and at least one stand leg mounted to the trailer for heightwise movement between an upper and a lower position, said stand leg supporting the trailer when the stand leg is in its lower position and the tractor and the trailer are disconnected; a signalling arrangement for warning that the stand leg is in a lowered position when the tractor and the trailer are connected by the connecting means comprising: signalling means located in the tractor for indicating when the stand leg is not in an upper fully retracted position; actuating means for the signalling means located on the trailer comprising a switch having an actuator movable between a first actuator position and a second actuator position; separable circuit means for joining the actuating means and the signalling means when the tractor and the trailer are connected; and operating means so constructed as to cause the signalling means to be turned on when the switch actuator is in said first actuator position and to cause the signalling means to be turned off when the switch actuator is in said second actuator position, effective when the circuit means is joining the actuating means and the signalling means, so constructed and arranged as to cause the actuating means to turn on the signalling means when the stand leg is in any position other than its upper fully retracted position, wherein said operating means comprises: an operating bar, in registry with said switch actuator, mounted for movement between a first operating bar position wherein it is disengaged from the switch actuator so that the switch actuator may be in said first actuator position and a second operating bar position wherein it is in engagement with the switch actuator so that the switch actuator is moved to said second actuator position; and moving means, interposed between the stand leg and the operating bar, so constructed and arranged as to maintain the operating bar in said first operating bar position when the stand leg is in said lower position and to place the operating bar in said second operating bar position when the stand leg is in said upper position.

2. The signalling arrangement of claim 1 wherein said moving means comprises: an activating rod mounted for heightwise movement between a lower activating rod position and an upper activating rod position; means so mounting the operating bar to the activating rod that the operating bar is in said first operating bar position when the activating rod is in said lower activating rod position and that the operating bar is in said second operating bar position when the activating rod is in said upper activating rod position; an abutment on the activating rod below the operating bar; an operating rod secured to the stand leg and mounted for heightwise movement in unison therewith; and a collar secured to the operating rod so located as to be below and in intersecting relationship with respect to the abutment; whereby the movement of the stand leg from its lower position to its upper position raises the operating rod and causes the collar to engage the abutment and move the activating rod from its lower 3. The signalling arrangement of claim 1 wherein said tractor includes an instrument panel and wherein said signalling means is mounted to said instrument panel. lower position to its upper position.

4. The signalling arrangement of claim 3 wherein said signalling means comprises a warning light and a buzzer.

5. The signalling arrangement of claim 1 wherein said separable circuit means comprises: a terminal block mounted to the trailer; a cable extending from the tractor and removably connected to the terminal block; a source of power in the tractor; and an electrical circuit extending through the terminal block and the cable joining the source of power, the signalling means and the actuating means in series.

* * * * *